W. C. HEDGCOCK.
SPRING RELEASE FOR BRAKES.
APPLICATION FILED FEB. 11, 1915.
1,143,706.
Patented June 22, 1915.
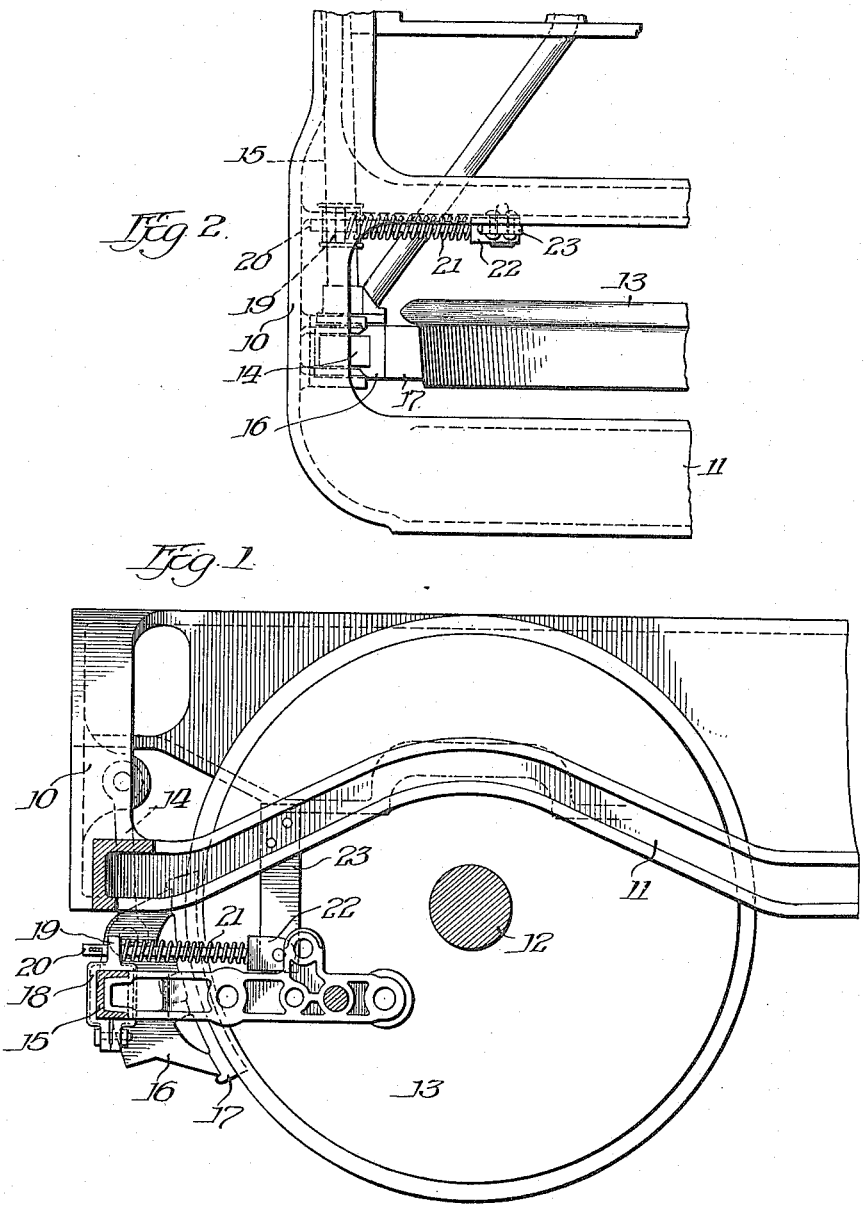

UNITED STATES PATENT OFFICE.

WILLIAM C. HEDGCOCK, OF CHICAGO, ILLINOIS, ASSIGNOR TO AMERICAN STEEL FOUNDRIES, OF NEW YORK, N. Y., A CORPORATION OF NEW JERSEY.

SPRING-RELEASE FOR BRAKES.

1,143,706.  Specification of Letters Patent.  Patented June 22, 1915.

Application filed February 11, 1915. Serial No. 7,466.

*To all whom it may concern:*

Be it known that I, WILLIAM C. HEDGCOCK, a citizen of the United States, and resident of Chicago, in the county of Cook and State of Illinois, have invented certain new and useful Improvements in Spring-Releases for Brakes, of which the following is a specification.

My invention relates to railway brakes and has particular reference to a novel release for displacing the brake shoes from the wheels after the braking force has been removed.

It is well understood that means should be provided for resiliently opposing the brake applying force to the end that the brake shoes may be removed from contact with the wheels after the braking force has been discontinued.

A particular object in devices of this sort is simplicity and cheapness in manufacturing cost. Furthermore a device of this sort is most effective throughout a long period when coiled springs are used, such springs having less tendency toward a loss of resiliency. Furthermore, by the use of a comparatively short coiled spring a sufficient degree of movement is permitted.

The invention will be more readily understood by reference to the accompanying drawings, wherein, Figure 1 is a side elevation of a portion of a car truck, some of the parts being in section in order to more clearly show the device, and, Fig. 2 is a plan view of the construction shown in Fig. 1.

Referring more particularly to the drawings it will be seen that my invention is shown as applied to a passenger truck, including a frame 10, and an intermediate bar 11, which passes over the axle 12, between the wheels 13. Suitably supported on the frame 10, by means of a hanger 14, is a brake beam 15, carrying brake heads 16, and shoes 17. A clamp 18, is applied to the compression member of the brake beam, which clamp has an eye 19, on its upper surface. Passing through the eye 19, is a bolt 20, on which is mounted a coiled spring 21. The opposite end of the bolt carries a yoke 22, which is pinned to a bracket 23, suitably riveted to the frame member 11. The coiled spring has a bearing against the yoke member 22, and against the eye 19, thus tending to force the brake beam away from the wheel 13. Although but one end of the brake beam is shown it will be understood that a similar releasing mechanism is applied to the opposite end of the beam. Such a construction provides for a very simple and efficient spring release for the brakes and is of such form as will not become disarranged or require attention after installation.

I claim:

In a device of the class described, the combination of a brake beam, clamps near the ends of said beam, each of said clamps being provided with an eye, a rod slidably engaging said eye, a spring mounted on said rod, and a stop carried by the truck frame and against which one end of said spring abuts, substantially as described.

Signed at Chicago, Ill., this 9th day of February, 1915.

WILLIAM C. HEDGCOCK.

Witnesses:
C. F. MURRAY,
T. D. BUTLER.

Copies of this patent may be obtained for five cents each, by addressing the "Commissioner of Patents, Washington, D. C."